United States Patent [19]

Li et al.

[11] Patent Number: 5,688,613
[45] Date of Patent: Nov. 18, 1997

[54] ELECTROCHEMICAL CELL HAVING A POLYMER ELECTROLYTE

[75] Inventors: Changming Li, Vernon Hills; Ke Keryn Lian, Northbrook, both of Ill.; Florence O. Eschbach, Duluth, Ga.

[73] Assignee: Motorola, Inc., Schaumburg, Ill.

[21] Appl. No.: 629,174

[22] Filed: Apr. 8, 1996

[51] Int. Cl.$^6$ .................. H01M 6/18; H01G 9/025
[52] U.S. Cl. .................. 429/192; 252/62.2; 429/30; 361/523; 361/525
[58] Field of Search .................. 429/192, 30, 18, 429/32, 33; 252/62.2; 361/501, 502, 523, 524, 525, 528, 529, 532, 434

[56] References Cited

U.S. PATENT DOCUMENTS

| 4,269,913 | 5/1981 | Lim et al. | 429/251 |
|---|---|---|---|
| 4,471,038 | 9/1984 | Vyas | 429/198 |
| 4,766,522 | 8/1988 | McHardy et al. | 361/433 |
| 5,525,436 | 6/1996 | Savinell et al. | 429/30 |
| 5,541,019 | 7/1996 | Anani et al. | 429/192 |

FOREIGN PATENT DOCUMENTS

| 0078404 | 3/1982 | European Pat. Off. . |
|---|---|---|
| 78404 | 5/1983 | European Pat. Off. . |
| 0115 525 | 9/1983 | European Pat. Off. . |

OTHER PUBLICATIONS

Polybenzimidazoles, vol. 11, pp. 572–601, Encyclopaedia of Polymer Science & Engineering, Wiley Interscience, ISBM 0–471–80944–6 (Date Unknown).

Publication entitled History and Development of Polybenzimidazole, Powers, et al, PBI Products Division, Hoechst Celanese; Symposium on the Istory of High Performance Polymers, ACS, 1986 (Date Unknown).

Heterocyclic Polymers, *Thermally Stable Polymers*, ISBN 0–8247–6969–4, Patrick Cassidy, 1980 (Month Unknown).

*Primary Examiner*—Alan Diamond
*Attorney, Agent, or Firm*—Kenneth M. Massaroni

[57] ABSTRACT

An electrochemical cell is provided with a first and second electrodes, and a solid polymer electrolyte disposed therebetween. The electrodes may either be of the same or different materials and may be fabricated from ruthenium, iridium, cobalt, tungsten, vanadium, iron, molybdenum, nickel, silver, zinc, and combinations thereof. The solid polymer electrolyte is in intimate contact with both the anode and the cathode, and is made from a polymeric support structure having dispersed therein an electrolyte active species. The polymer support structure is preferably a polybenzimidazole.

12 Claims, 7 Drawing Sheets

ELECTROCHEMICAL CELL HAVING A POLYMER ELECTROLYTE

TECHNICAL FIELD

This invention relates in general to electrochemical cells, and more particularly to electrochemical cells having a polymer electrolyte comprising a polymeric matrix or support structure and an electrolyte active species dispersed therein.

BACKGROUND OF THE INVENTION

Energy generation and storage has long been a subject of study and development. Of special importance is the storage of electrical energy in a compact form that can be readily charged and discharged such as rechargeable electrochemical batteries and/or electrochemical capacitors. High power, high current pulse rechargeable electrochemical charge storage devices are also becoming increasingly important in applications in which electrical pulses are demanded of the battery cells. Examples of such devices include digital communication devices, power tools, and portable computers to name but a few. In each of these devices, high electrochemical kinetic rate, long cycle life of the electrode material and good ionic conductivity of the electrolyte are all extremely important considerations.

Most electrochemical cells have heretofore relied upon aqueous or liquid electrolytes to provide ionic conductivity between the electrodes thereof. Unfortunately, aqueous liquid electrolytes have problems associated with sealing, packaging, and electrolyte leakage, all of which are well known in the industry. Solid polymer electrolytes were developed by numerous different companies in an effort to address the problems associated with liquid aqueous electrolytes. Each oh these different types of solid polymer electrolyte systems have met with varying degrees of success, typically owing to the fact that ionic conductivity is generally not as good as that found in a liquid aqueous system. Solid polymer electrolytes alleviate the problems experienced with respect to packaging and electrolyte leakage. In addition, polymer electrolytes have the additional advantage of being able to be formed into thin films to improve the energy density, and to act as an electrode spacer in order to eliminate an inert separator used in prior art.

One polymer electrolyte system which has received considerable interest particularly in electrochemical capacitor applications, is polyvinyl alcohol (PVA), having dispersed therein a proton conducting electrolyte active species such as $H_2SO_4$ or $H_3PO_4$. Unfortunately, the PVA/$H_3PO_4$ electrolytes developed heretofore are not completely stable at elevated temperatures. The mechanical strength of thin films of PVA based polymer electrolytes also needs further improvement for eliminating shorts during the assembly process. Further, the frequency response of certain polymer electrolyte based electrochemical capacitor devices is relatively narrow in comparison to dielectric capacitors. This performance differential may be partially improved by developing polymer electrolytes which have higher ionic conductivity.

Accordingly, there exists a need to provide novel electrochemical capacitor devices free of limitations inherent in the prior art. Such a device should be characterized by a polymer electrolyte system in which the polymeric support structure or matrix thereof is stable at higher temperatures, possesses a relatively wide frequency response, and has relatively high ionic conductivity, approaching that of an conventional liquid electrolyte. Moreover, fabrication of such an electrolyte layer should be simple, inexpensive and readily repeatable.

DETAILED DESCRIPTION OF THE PREFERRED EMBODIMENT

Figure 1:
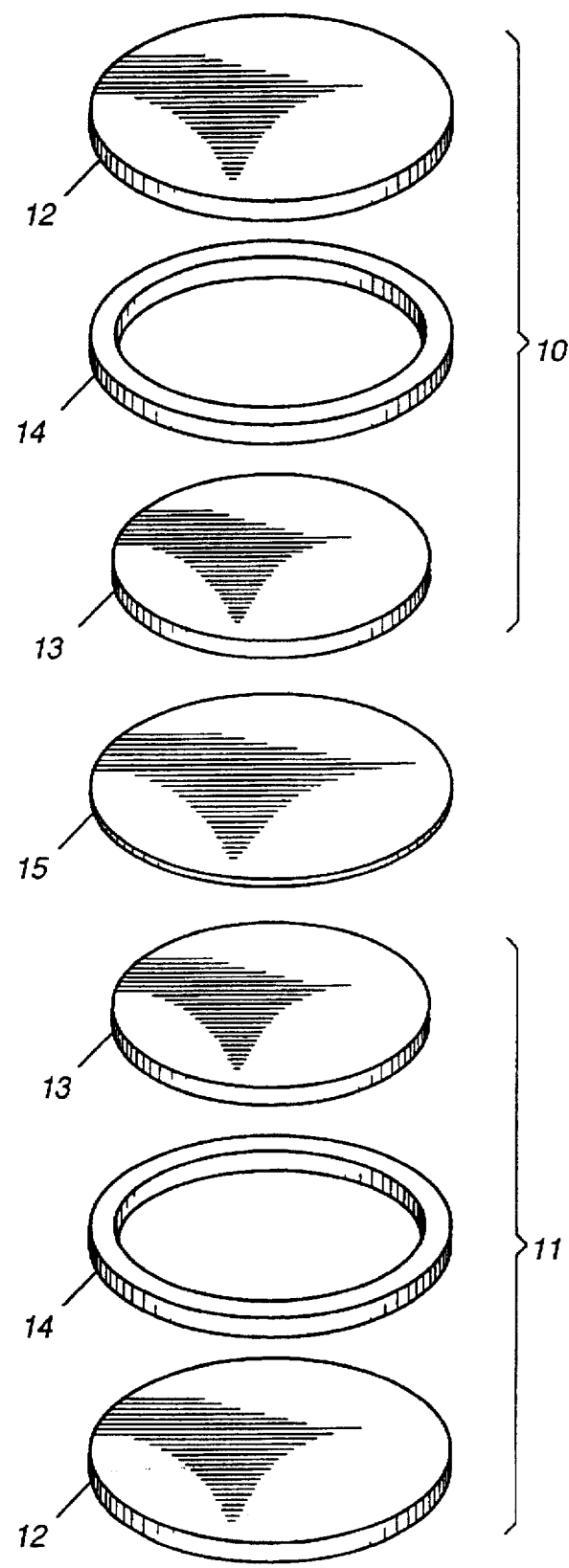
FIG. 1 is a schematic representation of an electrochemical charge storage device in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an energy storage device such as an electrochemical charge storage device fabricated from a pair of electrode assemblies 10 and 11, which may be the anode and the cathode of the device. The electrochemical charge storage device may be either an electrochemical capacitor or an electrochemical battery cell. The electrochemical capacitor is preferably an electrochemical capacitor characterized by an oxidation/reduction charge storage mechanism. Each electrode assembly 10 and 11 includes an electrode 13 which electrodes may either be fabricated from the same or different materials. In the instance in which the electrodes are fabricated of the same material, they are referred to as "symmetric electrodes". Conversely, if they are made from different materials, they are referred to as "asymmetric electrodes". Regardless of whether or not the electrodes are asymmetric or symmetric, they are each made from one or more materials selected from the group consisting of ruthenium, iridium, platinum, cobalt, tungsten, vanadium, iron, nickel, molybdenum, silver, zinc, lead, manganese, alloys thereof, nitrides thereof, carbides thereof, sulfides thereof, oxides thereof, and combinations thereof. Attentively, said electrodes may be fabricated of conducting polymers.

Each electrode assembly may further include a current collector 12 which is electrically conducting. The current collector 12 is preferably chemically inert in the polymer electrolyte 15 described hereinbelow. A housing or gasket 14 may be employed to house the electrode and the electrolyte, but is optional. The electrolyte 15 is sandwiched between the electrodes and is in the form of a film, such as a polymer, which may also serve as a separator between the two electrodes. This structure thus affords free and unobstructed movement to the ions in the electrolyte. The combination electrolyte/separator prevents contact between the opposing electrodes since such a condition would result in a short circuit and malfunction of the electrochemical cell.

In a preferred embodiment of the instant invention, the electrolyte is a polymer electrolyte which is disposed between and in contact with both the electrode assemblies. The polymer electrolyte comprises a polymer support structure or matrix which has an electrolyte active species disposed or dispersed therein. The polymeric support structure or matrix preferably is fabricated of a polybenzimidazole (FBI). PBI first appeared in U.S. Pat. No. 2,895,948 in 1959. The polymeric matrix is fabricated of polybenzimidazole synthesized from tetra amino compounds with diacids. This is illustrated in scheme 1 below:

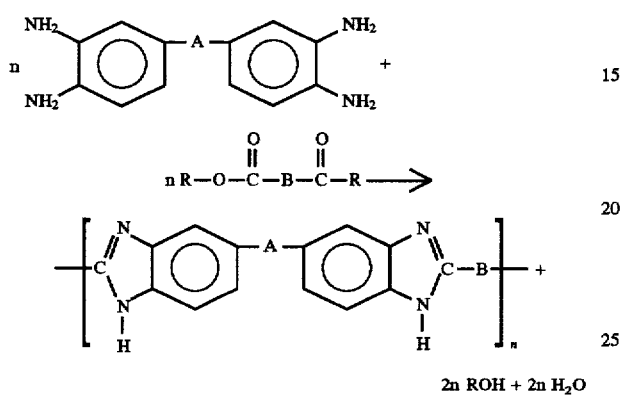

A and B above can be aromatic or aliphatic and may contain other groups such as ethers, ketones, sulfones, and combinations thereof. In addition, naphtyl groups could be substituted for phenyl groups in the structure. Reference may also be made to *Thermally Stable Polymers*, Decker, Inc., Chapter 6 at pages 141, et. seq.

Polybenzimidazoles synthesized from aromatic tetra amines and aromatic dicarboxylates exhibit the highest thermal and chemical stability. Therefore preferred PBI's are selected from the group synthesized from aromatic tetra amines and aromatic dicarboxylates. Preferred PBI's include poly{2,2'-m-(phenylene)-5,5'-bibenzimidazole} which is synthesized from diphenyl isophtholate and tetra amino biphenyl according to the following scheme:

Scheme 2
Synthesis of Poly (2,2"-m-(phenylene)-5,5"-bibenzimidazole

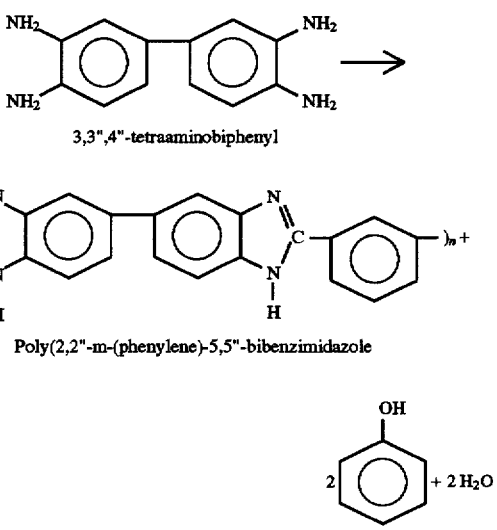

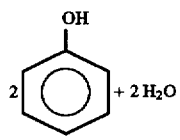

A preferred polybenzimidazole is poly{2,2'-m-(phenylene)-5,5'-bibenzimidazole. This FBI is an amorphous thermoplastic polymer with a glass transition temperature of 430° C. Accordingly, FBI does not melt under most conditions and is soluble only in a few solvents such as sulfuric acid, dimethylformimide, dimethylsulfoxide, methylpyrrolidone, and dimethylacetamide. Due to the presence of amine groups in its repeat unit, PBI is highly hydrophilic. In the presence of acids and bases, a PBI polycation is formed leading to acid or base neutralization in the formation of a salt with the imidazole ring structure. This may be understood from the following scheme.

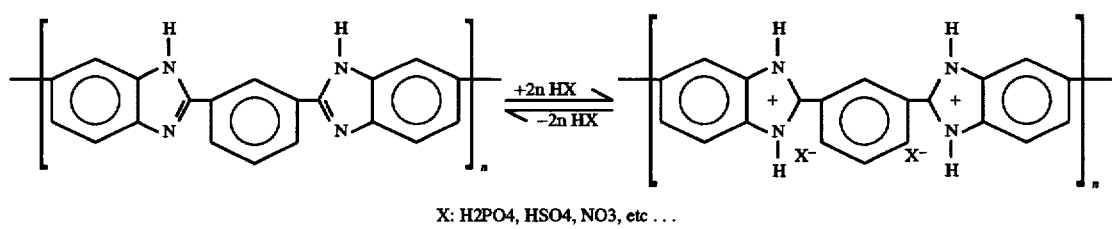

X: H2PO4, HSO4, NO3, etc ...

Dispersed within the polymer support structure is a proton conducting electrolyte active species. The proton conducting electrolyte active species may be selected from the group of materials consisting of $H_3PO_4$ (phosphoric acid), $H_2SO$, (sulfuric acid), HCl (hydrochloric acid), $HNO_3$, and combinations thereof. Alternatively, the electrolyte active species may be a metal hydroxide such as KOH, NaOH, LiOH, CeOH, and combinations thereof. In one preferred embodiment, the polymer electrolyte is made from poly{2,2'-m-(phenylene)-5,5'-bibenzimidazole} and phosphoric acid.

PREPARATION OF PBI SOLID ELECTROLYTES

Preparation of PBI solid electrolytes for electrochemical capacitors starts by the providing of a PBI film. PBI films are Scheme 2
Synthesis of Poly (2,2"-m-(phenylene)-5,5"-bibenzimidazole

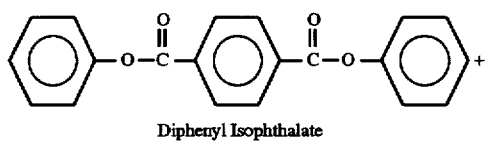

Diphenyl Isophthalate available from Hoechst Celanese Corporation. The PBI film was heated in boiling deionized water between one and eight hours and then soaked in an 85% solution of $H_3PO_4$ for at least an additional 8 hours. It was observed that the PBI film did not swell following the 8 hour soak at $H_3PO_4$ and retained very good mechanical integrity. Extending the boiling and soaking time may result in better conductivity. For example, experiments have shown that PBI/$H_3PO_4$ boiled for one hour and soaked for eight hours has ionic conductivity of $1.65 \times 10^{-2}$ Siemens per centimeter (S/cm). Longer boiling times will also tend to decrease the leakage current for the solid electrolyte based capacitors. It is hypothesized that this is due to removal of impurities in the film, thus decreasing the electronic conductivity of the films. In order to prepare PBI/KOH polymer electrolytes, the boiled PBI films were soaked in concentrated KOH solutions of 21% to 80% for at least 8 hours. KOH solutions with higher concentrations could reduce soaking time. The conductivity of PBI/KOH solid electrolyte films was measured at up to $2 \times 10^{-2}$ S/cm.

PBI/$H_3PO_4$ solid electrolytes as described hereinabove were used to fabricate electrochemical capacitor devices. The solid electrolyte was tested with electrode materials including nickel-molybdenum-chromium based alloys, zinc foils, silver foils, and ruthenium oxide coated titanium foils, each of which are commercially available. Bipolar devices were constructed by stacking a plurality of capacitor subassemblies as shown in FIG. 1. A PAR Potentiaostat 273 was used for conducting cyclic voltammogram measurements. AC impedance was measured by Solartron instruments, and the conductivity of the solid electrolytes was measured using an HP milliometer. All temperature experiments were carried out in an environmental chamber.

EXAMPLE 1

Figure 2:
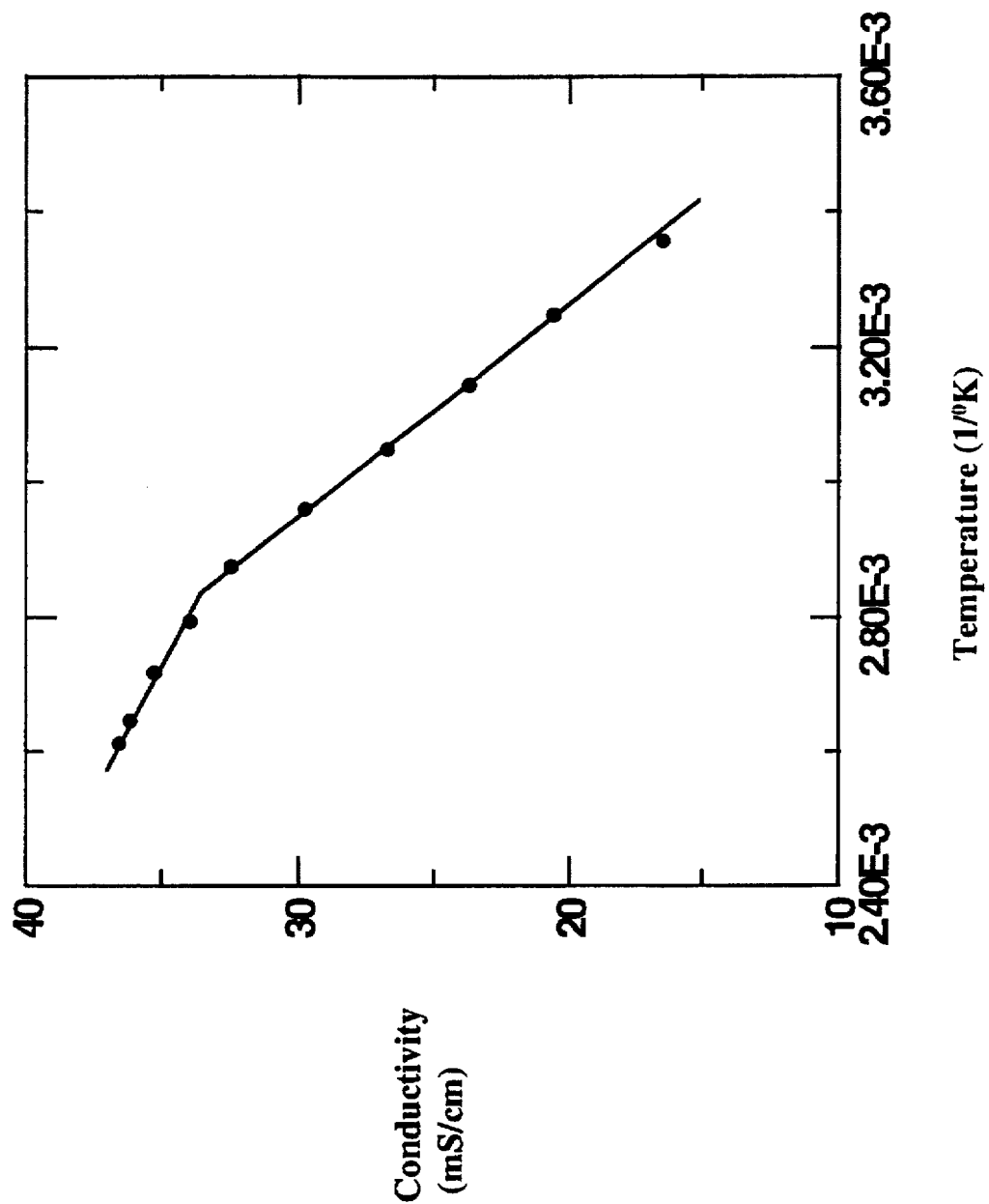
FIG. 2 is a log plot illustrating the relationship between conductivity and temperature for a device in accordance with the invention.

Tests for temperature effect on the conductivity of the PBI/$H_3PO_4$ electrolytes were carried out with a device consisting of a pair of symmetric electrodes fabricated with ruthenium oxide coated on titanium foil and sandwiching a PBI/$H_3PO_4$ solid electrolyte file. The testing temperature was up to 483° K. (110° C.). The results of this test are shown in FIG. 2 hereof. As may be appreciated from a perusal of FIG. 2, the conductivity of the PBI solid electrolyte increased with the increase of temperature. The plot of conductivity versus temperature had two linear regions above and below 100° C., indicating that PBI/$H_3PO_4$ electrolytes may have two forms with a transition temperature at approximately 100° C. However, the results show that the conductivity was good in both temperature ranges. Conductivity ranged from approximately $10^{-3}$ to $10^{-2}$ S/cm, compared with most other polymer electrolytes which have conductivity in the range of $10^{-5}$ to $10^{-3}$ S/cm.

EXAMPLE 2

Figure 3:
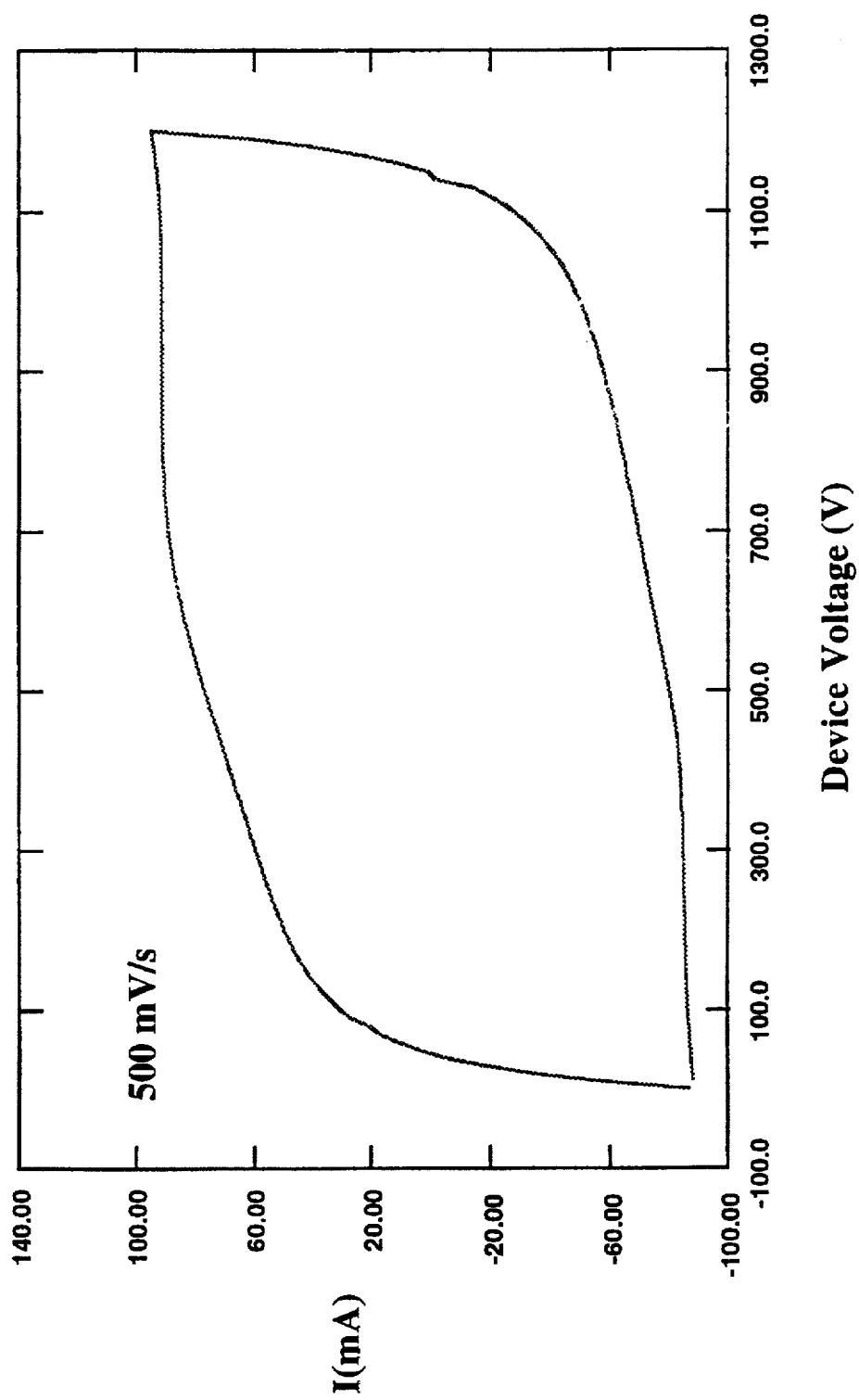
FIG. 3 is a cyclic voltammogram (CV) for a device in accordance with the instant invention.

Referring now to FIG. 3, there is shown therein a cyclic voltammogram (CV) for a capacitor device such as that used in Example 1. The electrode surface area was approximately 6.25 cm² as in Example 1. The CV curve of FIG. 3 is well shaped and has a 1 volt potential window. No significant gas evolution was observed from the measured CV curve. Capacitance calculated from the CV curve was 160 millifarads (mF), equivalent to a specific capacitance of 25.6 millifarads per cm². The performance demonstrated that the PBI/$H_3PO_4$ solid electrolyte had good conductivity and good mechanical properties.

EXAMPLE 3

Figure 4:
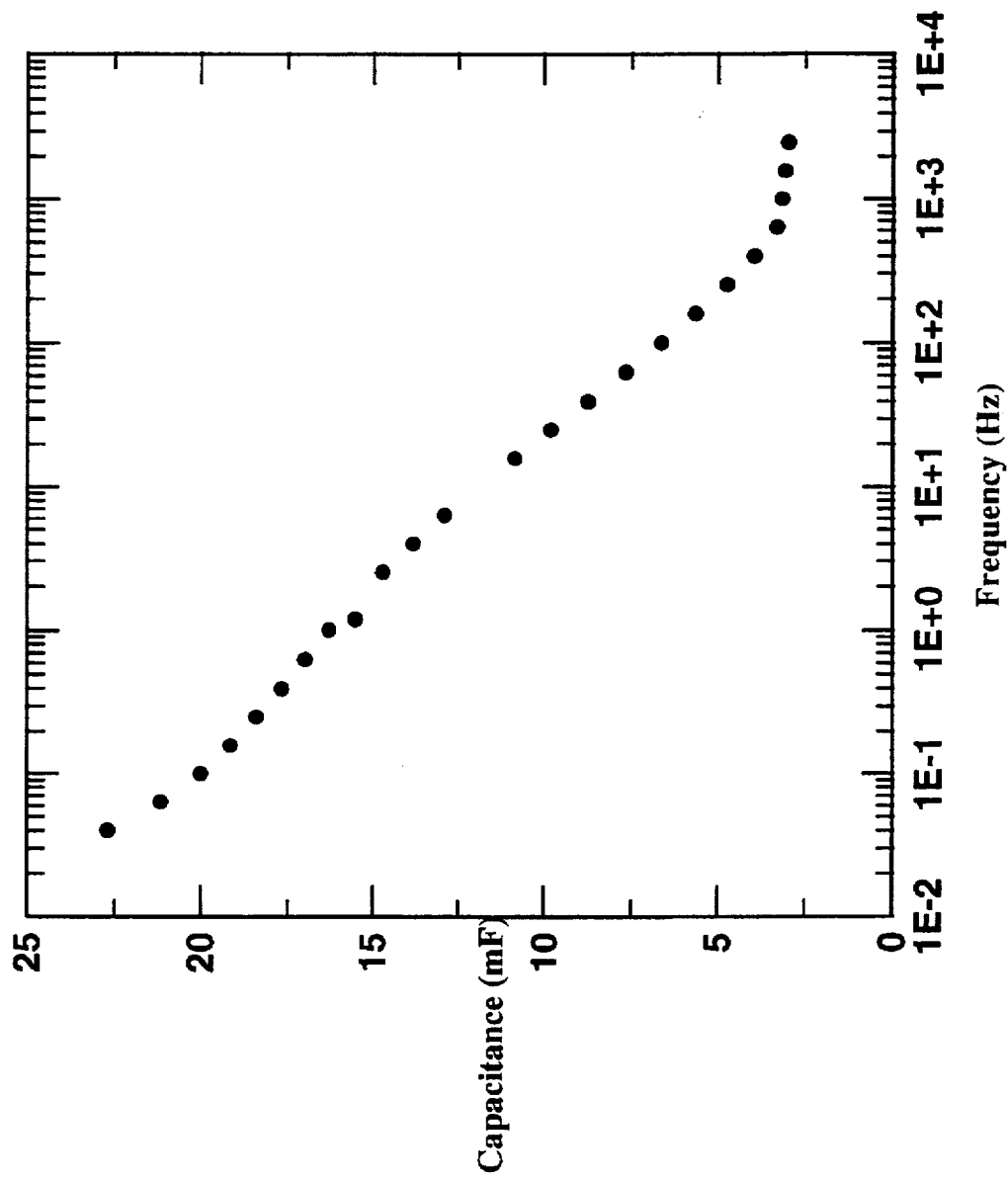
FIG. 4 is a graph illustrating the relationship between frequency and capacitance for a device in accordance with the invention.

Referring now to FIG. 4, there is illustrated therein the frequency response plot of the capacitance of the same device described hereinabove with respect to Examples 1 and 2. The device is shown to have acceptable frequency response up to about 2500 Hz. Accordingly, the PBI/$H_3PO_4$ solid electrolyte has a frequency response which is approximately 1 order of magnitude better than known prior art solid electrolytes.

EXAMPLE 4

Figure 5:
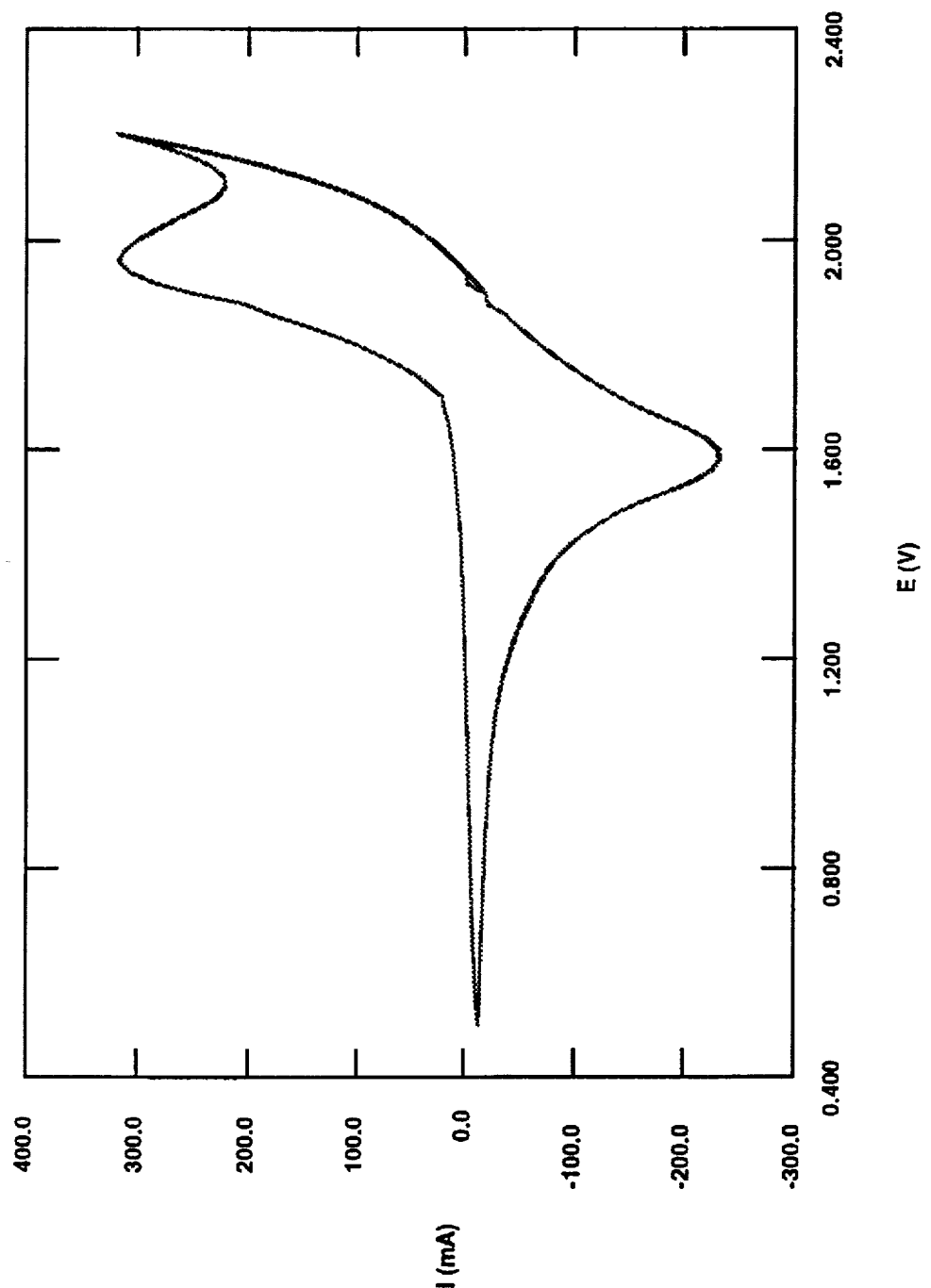
FIG. 5 is a CV for a second device in accordance with the instant invention.

Referring now to FIG. 5, there is illustrated therein the CV curve for an electrochemical capacitor device having asymmetric electrodes, wherein the first electrode is fabricated of a nickel/chromium/molybdenum alloy known as Hastelloy $C_{22}$, and the second electrode is made of a zinc foil and the solid electrolyte is a PBI/KOH solid film. The sweep rate of the CV illustrated in FIG. 5 is 5 volts per second suggesting that the device is suitable for high power applications. The CV curve is relatively well defined, demonstrating that the PBI/KOH electrolyte has relatively good ionic conductivity. Predicted working voltage from the CV curve is approximately 1.6 volts. Further, since the PBI is generally stronger than prior art films such as PVA, it will provide a substantial mechanical advantage over the prior art.

EXAMPLE 5

Figure 6:
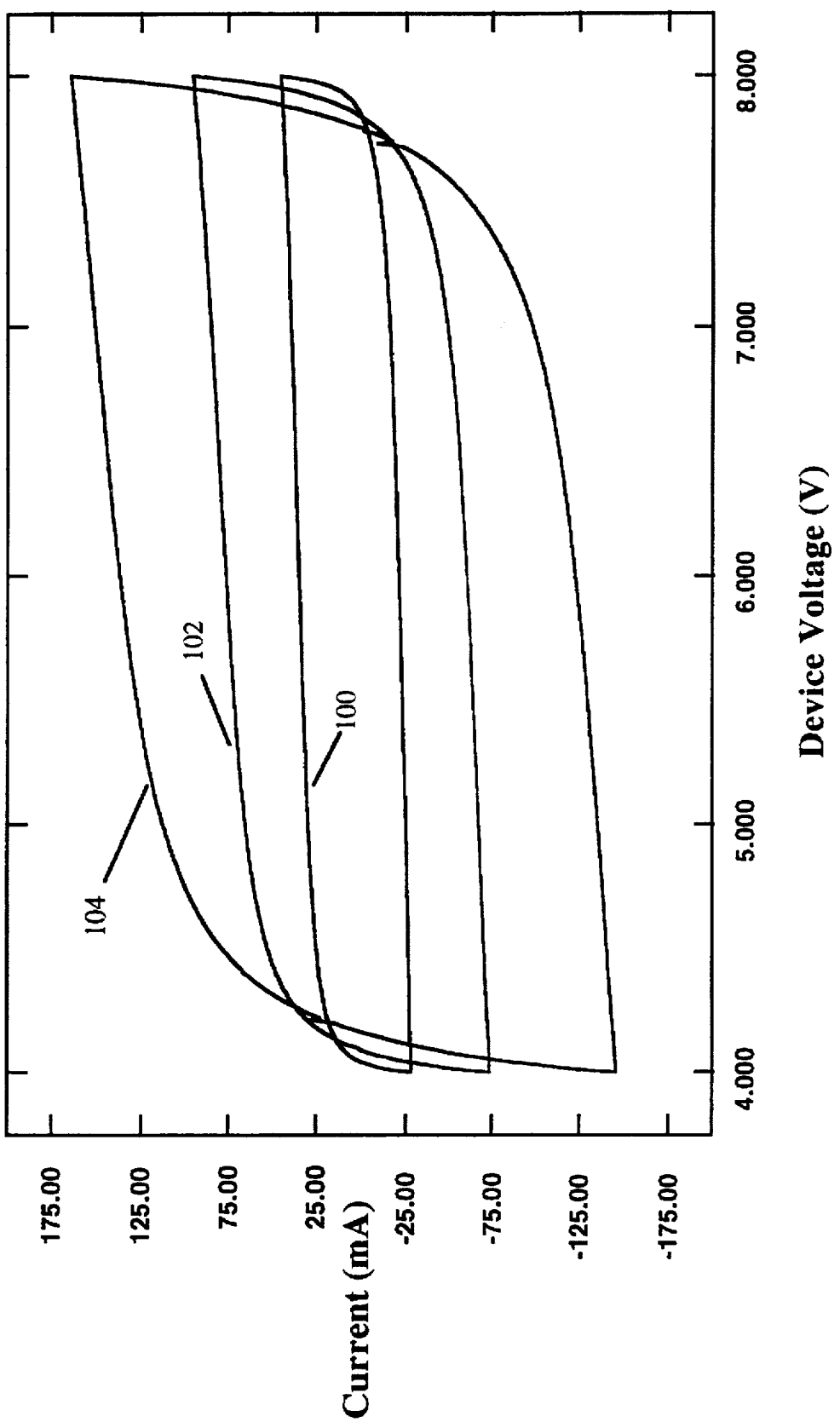
FIG. 6 is a CV for a third device in accordance with the instant invention.

In this example, 8 cells such as that described hereinabove with respect to FIG. 1 were arranged in a stacked configuration. CV curves for this 8 cell stacked device are shown in FIG. 6. Specifically, FIG. 6 illustrate CV's taken at sweep rates of 2 volts per second, (line 100), 5 volts per second, (line 102), and 10 volts per second, (line 104). Each of these sweep rates demonstrate a CV curve which is well shaped indicating good cyclability with a relatively large potential window. The capacitance was constant at 14 mF for each of the different scan rates demonstrating a good frequency response.

EXAMPLE 6

Figure 7:
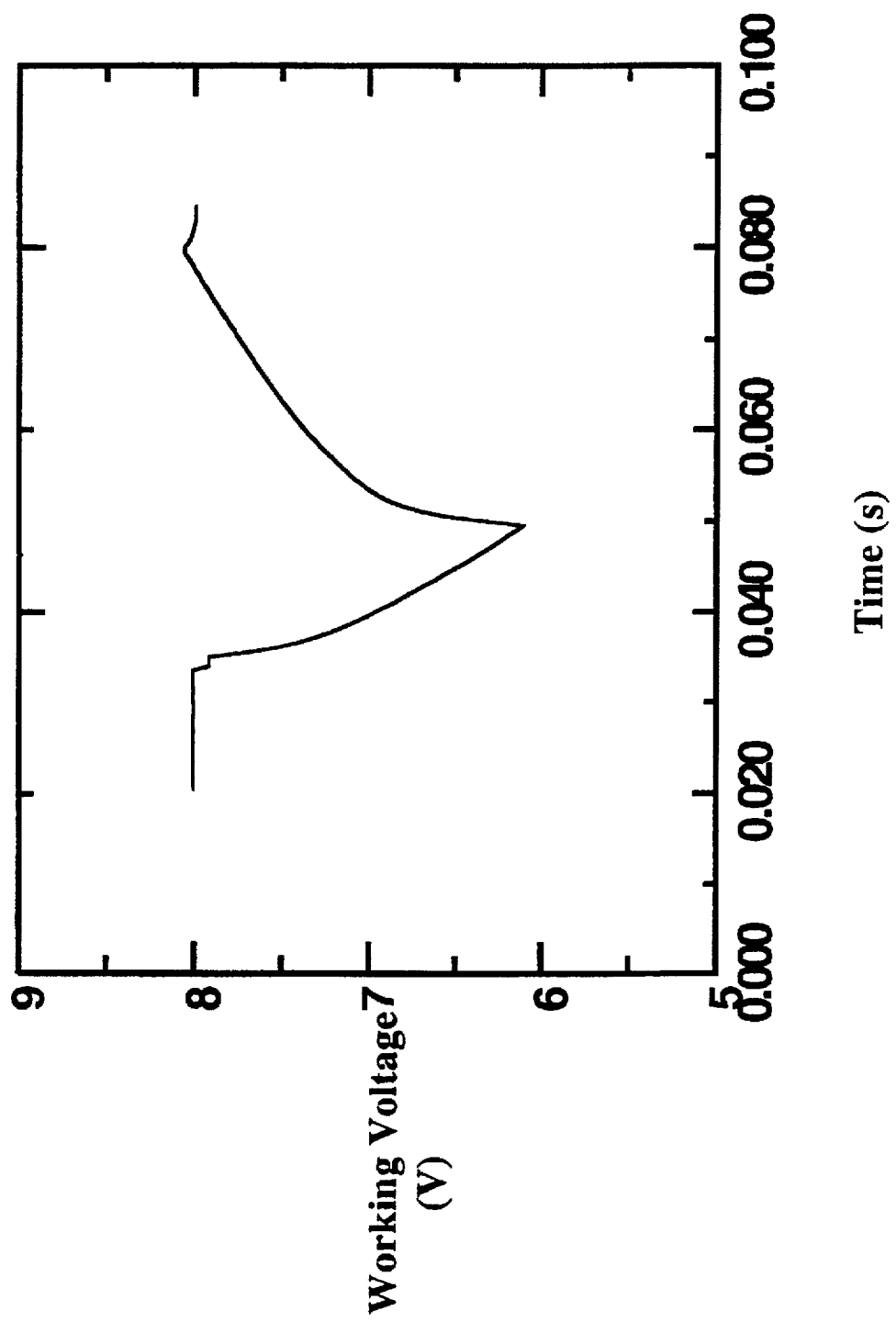
FIG. 7 is a charge/discharge curve, at a discharge current of 1 amp, for a device in accordance with the instant invention.

The eight cell device described hereinabove in Example 5 was tested again according to a particularly rigorous pulse-power requirement application. The results are shown in FIG. 7. During constant discharge currents of 1 amp, voltage drop was 1.8 volts respectively. The capacitance is calculated from both discharge currents for 14 mF. The discharge curves did not show significant ESR drop, thus voltage drop can be easily calculated by increasing the single cell capacitance and by increasing the specific capacitance of electrode materials and/or electrode surface. Experimental results demonstrated that the current efficiency during charging/discharge processes was approximately 99.6% indicating that there is no significant gas evolution during charge processes.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical capacitor device comprising:

first and second electrodes fabricated of materials selected from the group consisting of Ru, Ir, Co, W, V, Fe, Mo, Ni, Ag, Zn, Pb, Mn, alloys thereof, oxides thereof, carbides thereof, nitrides thereof, sulfides thereof, and combinations thereof, and a polymer film electrolyte disposed between and in contact with said electrodes, said polymer film electrolyte comprising a polymer matrix of a polybenzimidazole having a metal hydroxide electrolyte active species dispersed therein.

2. An electrochemical capacitor device as in claim 1, wherein said polybenzimidazole is poly{2,2'-m-(phenylene)-5,5'-bibenzimidazole}.

3. An electrochemical capacitor device as in claim 1, wherein said first and second electrodes are symmetric.

4. An electrochemical capacitor device as in claim 1, wherein said first and second electrodes are asymmetric.

5. An electrochemical capacitor device as in claim 1 wherein said metal hydroxide electrolyte active species is selected from the group consisting of KOH, NaOH, LiOH, CeOH, and combinations thereof.

6. An electrochemical capacitor device as in claim 1, wherein said capacitor stores charge via an oxidation/reduction charge storage mechanism.

7. An electrochemical cell comprising:

an anode and a cathode each fabricated of the same material, said material selected from the group consisting of Ru, Ir, Co, W, V, Fe, Mo, Ni, Ag, Zn, Pb, Mn, alloys thereof, oxides thereof, carbides thereof, nitrides thereof, sulfides thereof, and combinations thereof, and a polymer electrolyte disposed between and in contact with said anode and said cathode, said polymer electrolyte comprising a polybenzimidazole polymer matrix, and having dispersed therein a metal hydroxide electrolyte active species.

8. An electrochemical cell as in claim 7, wherein said polybenzimidazole is poly{2,2'-m-(phenylene)-5,5'-bibenzimidazole}.

9. An electrochemical cell as in claim 7, wherein said device is a capacitor.

10. An electrochemical cell as in claim 7, wherein said capacitor stores charge via an oxidation/reduction charge storage mechanism.

11. An electrochemical cell as in claim 7, wherein said anode and said cathode are each fabricated of $RuO_2$.

12. An electrochemical capacitor device comprising:

at least two subassemblies arranged in stacked configuration, each of said subassemblies comprising an anode and a cathode fabricated of at least one material selected from the group consisting of Ru, Ir, Co, W, V, Fe, Mo, Ni, Ag, Zn, alloys thereof, oxides thereof, carbides thereof, nitrides thereof, sulfides thereof, and combinations thereof; and a polymer matrix fabricated of poly{2,2'-m-(phenylene)-5,5'bibenzimidazole}, and having dispersed therein a metal hydroxide electrolyte active species.

* * * * *